UNITED STATES PATENT OFFICE.

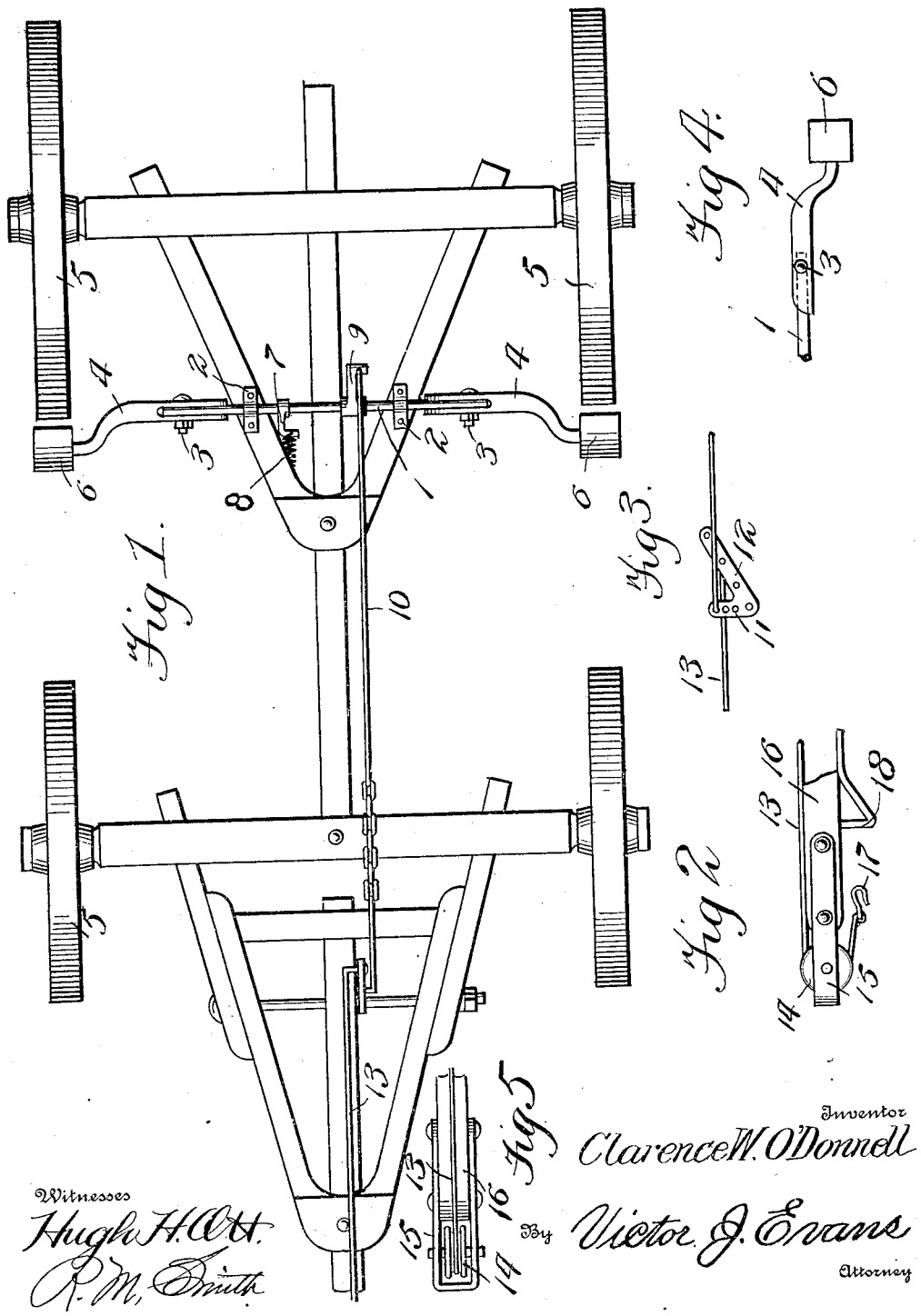

CLARENCE W. O'DONNELL, OF LOGANTON, PENNSYLVANIA.

WAGON-BRAKE.

No. 926,590.  Specification of Letters Patent.  Patented June 29, 1909.

Application filed May 6, 1908. Serial No. 431,197.

*To all whom it may concern:*

Be it known that I, CLARENCE W. O'DONNELL, a citizen of the United States, residing at Loganton, in the county of Clinton and State of Pennsylvania, have invented new and useful Improvements in Wagon-Brakes, of which the following is a specification.

This invention relates to automatic vehicle brakes, the object of the invention being to provide a simple and efficient brake which is automatically thrown into operation by the holding-back action of the animals when proceeding down a hill or incline, said holding-back of the animals serving to automatically apply the brake shoes to the vehicle wheels and check the movement of the vehicle without any attention whatever on the part of the driver.

With the above general object in view, the nature of which will more fully appear as the description proceeds, the invention consists in the novel construction, combination and arrangement of parts as herein fully described and illustrated.

In the accompanying drawings:—Figure 1 is a plan view of the running gear of a wagon showing the brake mechanism applied thereto. Fig. 2 is a side elevation of the pulley connections at the front end of the draft pole or tongue. Fig. 3 is a detail side elevation of the bell crank lever. Fig. 4 is a detail elevation of a portion of the rock shaft and one of the brake shoes and the carrier therefor. Fig. 5 is a plan view of the arrangement shown in Fig. 2.

The brake mechanism comprises essentially a rock shaft 1 which is mounted adjacent to the rear axle of the running gear and journaled in suitable bearings 2 secured to the running gear. Pivotally connected to opposite ends of the rock shaft 1 on horizontal pivots 3, which may consist of bolts as shown, are brake shoe carriers 4 the outer ends of which are adapted to rise and fall under the influence of their contact with the wheels 5 of the vehicle, each of said carriers 4 being provided at its outer end with a brake shoe 6 adapted to be moved into and out of contact with the wheels 5.

The rock shaft 1 is provided with a crank arm 7 from which a relief spring 8 extends to a fixed point on the running gear said spring and crank arm serving to hold the brake shoes normally out of contact with the wheels.

The rock shaft 1 is provided with an operating crank arm 9 from the end of which a connection 10 extends forward and is attached to one arm 11 of a bell crank lever, the opposite arm 12 of which has attached thereto one end of another connection 13 which extends forward and passes around a pulley 14 journaled in a pulley bracket 15 secured to the forward end of the tongue 16 of the vehicle. The connection 13 is flexible to enable it to pass around the pulley 14 and said connection is provided with a terminal hook 17 which is adapted to be detachably connected to the ring of the usual neck-yoke so that when the draft animals hold back in descending a hill they draw on the connection 13 and thereby rock the bell crank which in turn pulls forward on the connection 10 and turns the rock shaft far enough to apply the brake shoes 6 to the wheels 5. When the pulling strain on the connection is relieved, the relief spring 8 acts to move the shoes 6 away from the wheel. In backing the vehicle, the shoes 6 are adapted to move upward while in contact with the wheels 5, thus preventing any braking action at such time.

In order to limit the holding-back action a stop shoulder 18 is provided on the tongue 16 with which the neck yoke is adapted to come in contact as will be understood by those familiar with the art to which this invention appertains.

The bell crank lever 11—12 is located in line with and preferably mounted on the pivot bolt of the tongue so that the pivotal movement of the tongue will not affect the brakes.

I claim:—

In a wagon brake, the combination with the running gear and tongue of the wagon, of a rock shaft journaled on the running gear, brake shoe carrying arms pivotally connected to said rock shaft to swing in a substantially vertical plane, a crank arm on said shaft, a bell crank lever located in line with the pivot point of the tongue, a connection between said crank arm and the bell crank lever, a second connection extending from the bell crank lever forward, a guide pulley at the forward extremity of the tongue around which said connection passes, means for securing said last-named connection to of the tongue for limiting the backward movement of the neck yoke.

In testimony whereof I affix my signature in presence of two witnesses.

CLARENCE W. O'DONNELL.

Witnesses:
W. C. KRESS,